United States Patent
Tampio et al.

(10) Patent No.: US 12,141,932 B2
(45) Date of Patent: Nov. 12, 2024

(54) ARRANGEMENT AND METHOD FOR PROVISION OF ENHANCED TWO-DIMENSIONAL IMAGING DATA

(71) Applicant: Disior Ltd., Englewood, CO (US)

(72) Inventors: Juha Tampio, Tampere (FI); Eero Huotilainen, Espoo (FI); Jari Salo, Helsinki (FI)

(73) Assignee: Disior Ltd., Englewood, CO (US)

( * ) Notice: Subject to any disclaimer, the term of this patent is extended or adjusted under 35 U.S.C. 154(b) by 86 days.

(21) Appl. No.: 17/663,128

(22) Filed: May 12, 2022

(65) Prior Publication Data

US 2022/0270339 A1    Aug. 25, 2022

Related U.S. Application Data

(63) Continuation of application No. PCT/FI2020/050762, filed on Nov. 16, 2020.

(30) Foreign Application Priority Data

Nov. 15, 2019 (FI) .................................... 20195977

(51) Int. Cl.
*G06T 19/20* (2011.01)
*G06T 7/11* (2017.01)
*G06T 11/00* (2006.01)

(52) U.S. Cl.
CPC .............. *G06T 19/20* (2013.01); *G06T 7/11* (2017.01); *G06T 11/005* (2013.01);
(Continued)

(58) Field of Classification Search
None
See application file for complete search history.

(56) References Cited

U.S. PATENT DOCUMENTS 6,574,304 B1   6/2003  Hsieh et al.
2003/0223627 A1*  12/2003  Yoshida ............... G06T 7/11
                                                        382/128
(Continued)

FOREIGN PATENT DOCUMENTS

JP   H09073557 A   3/1997
JP   2008508977 A   3/2008
(Continued)

OTHER PUBLICATIONS

International Search Report and Written Opinion for PCT/FI2020/050762 dated Feb. 1, 2021—13 pages.
(Continued)

*Primary Examiner* — Sultana M Zalalee
(74) *Attorney, Agent, or Firm* — Heslin Rothenberg Farley & Mesiti P.C.; Matthew M. Hulihan, Esq.

(57) ABSTRACT

An arrangement for provision of enhanced two-dimensional digital imaging data, the arrangement comprising at least one processor that is configured to obtain three-dimensional digital imaging data indicative of at least one physical feature, determine, based on said three-dimensional digital imaging data, data representing a three-dimensional model of at least one element that is partitioned from the three-dimensional digital imaging data, said element comprising at least one of said physical features, select one or more elements as redundant elements, and provide enhanced two-dimensional digital imaging data indicative of the at least one physical feature with the one or more redundant elements being essentially omitted from the two-dimensional imaging data based at least on the data representing a three-dimensional model of the at least one element and the selected redundant elements.

12 Claims, 4 Drawing Sheets

(52) U.S. Cl.
CPC ............... *G06T 2207/10081* (2013.01); *G06T 2207/10088* (2013.01); *G06T 2207/10132* (2013.01); *G06T 2207/30004* (2013.01); *G06T 2210/41* (2013.01)

(56) References Cited

U.S. PATENT DOCUMENTS

| | | | |
|---|---|---|---|
| 2004/0032978 A1* | 2/2004 | Hsieh | G06T 15/40 |
| | | | 382/131 |
| 2005/0163278 A1 | 7/2005 | Metz et al. | |
| 2006/0257053 A1* | 11/2006 | Boudreau | G06F 18/00 |
| | | | 382/128 |
| 2008/0259080 A1 | 10/2008 | Masumoto et al. | |
| 2009/0324095 A1* | 12/2009 | Sakairi | G06F 30/20 |
| | | | 382/203 |
| 2010/0296623 A1* | 11/2010 | Mielekamp | G06T 19/20 |
| | | | 378/98.2 |
| 2012/0200560 A1 | 8/2012 | Masumoto | |
| 2017/0055931 A1* | 3/2017 | Paysan | G06T 11/008 |
| 2017/0337680 A1* | 11/2017 | Weber | G06T 7/149 |
| 2018/0344161 A1* | 12/2018 | Meyer | A61B 5/0037 |
| 2019/0046144 A1 | 2/2019 | Behrooz et al. | |
| 2019/0188885 A1* | 6/2019 | Grass | A61B 6/5235 |
| 2019/0206069 A1* | 7/2019 | Buerger | G06T 7/32 |
| 2020/0138394 A1* | 5/2020 | Vanden Berghe | G16H 50/30 |

FOREIGN PATENT DOCUMENTS

| | | |
|---|---|---|
| JP | 2008125881 A | 6/2008 |
| JP | 2013022086 A | 2/2013 |
| WO | 2019014585 | 1/2019 |

OTHER PUBLICATIONS

Zheng, Y. et al. Fast and Automatic Heart Isolation in 3D CT Volumes: Optimal Shape Initialization. In: International Workshop on Machine Learning in Medical Imaging, Springer-Verlag [online], Sep. 20, 2010, 2 pages, Berlin, Germany.

Zheng, Y. et al. Four-Chamber Heart Modeling and Automatic Segmentation for 3-D Cardiac CT Volumes Using Marginal Space Learning and Steerable Features. In: IEEE Transactions on Medical Imaging. IEEE [online], Nov. 2008, 1 page.

Johnson, H. et al. Book 1: Introduction and Development Guidelines, Book 2: Design and Functionality. In: The ITK Software Guide. Insight Software Consortium [online], May 28, 2019, 983 pages.

Search Report for FI20195977 from Finnish Patent and Registration Office, Jun. 15, 2020, 2 pages.

Office Action (with translation) in Application No. Number of Patent Application 2022-528329, dated Mar. 19, 2024, 8 pgs.

* cited by examiner

7C: INVENTION

7B: PRIOR ART

7D: INVENTION

ARRANGEMENT AND METHOD FOR PROVISION OF ENHANCED TWO-DIMENSIONAL IMAGING DATA

CROSS-REFERENCE TO RELATED APPLICATIONS

This application is a continuation of PCT Application No. PCT/FI2020/050762 filed on Nov. 16, 2020, entitled "Arrangement and Method For Provision of Enhanced Two-Dimensional Imaging Data", which claims the benefit to Finnish National Application No. FI 20195977 filed on Nov. 15, 2019, both of said applications are incorporated herein by reference in their entireties.

FIELD OF THE INVENTION

The invention is related to imaging data in general. More specifically, the invention is related to an arrangement and method for providing enhanced two-dimensional imaging data through removal of selected features.

BACKGROUND OF THE INVENTION

Images for use in medical applications, such as radiology, are highly important in being able to diagnose and treat various types of disorders. Obtaining high-quality images providing the relevant information in each case is vital for enabling efficient interpretation of the images by medical personnel.

Traditional two-dimensional medical images, such as native X-ray images, may give limited information especially regarding tissue of interest, as a generated projection image obtained through utilizing information on how intensity of, for example, an X-ray beam is attenuated as it traverses through tissue gives information on all physical features that are confronted by the X-ray beams, and the resulting projection image may have tissue of interest lost or buried within or obstructed by the information regarding other, redundant physical features, such that meaningful analysis of the physical features of interest may be difficult or impossible. A produced image may not clearly show the tissue of interest due to information relating to redundant tissues or other physical features that are redundant distracting the projection image formation. In these cases, diagnosis or treatment may be hindered.

Three-dimensional digital medical imaging data may be readily utilized to produce two-dimensional images. Various techniques exist for converting such three-dimensional imaging data into two-dimensional projection images, but these will still have the aforementioned problem of tissue of interest possibly being entirely or partially affected in a detrimental way by data relating to other tissue, rendering the produced two-dimensional images possibly not giving enough information on tissue of interest.

Three-dimensional imaging data may be used to obtain visualizations incorporating three-dimensional aspects, but in certain circumstances two-dimensional images may be required (e.g., for use in insurance companies) for providing data related to some tissue of interest. Three-dimensional imaging techniques may be used to provide two-dimensional images (e.g., computed tomography (CT) slice images), but these two-dimensional images may lack information relating to three-dimensional aspects of, for example, tissues of a patient.

SUMMARY OF THE INVENTION

A purpose of the invention is to alleviate at least some of the problems relating to the known prior art. In accordance with one aspect of the present invention, an arrangement is provided for provision of enhanced two-dimensional digital imaging data, the arrangement comprising at least one processor that is configured to obtain three-dimensional digital imaging data indicative of at least one physical feature, determine, based on said three-dimensional digital imaging data, data representing a three-dimensional model of at least one element that is partitioned from the three-dimensional digital imaging data, said element comprising at least one of said physical features. The arrangement is additionally configured to select one or more elements as redundant elements, determine data constituents in the three-dimensional imaging data that are related to the redundant element, and provide enhanced two-dimensional digital imaging data indicative of the at least one physical feature with the one or more redundant elements being essentially omitted from the two-dimensional imaging data based at least on a remaining portion of the three-dimensional imaging data from which the data constituents related to the redundant element are essentially omitted.

With advantageous embodiments of the present invention, an arrangement and method may be provided for obtaining enhanced two-dimensional imaging data where relevant physical features may be more clearly visible as elements such as unimportant physical features can be essentially omitted. In the prior art, two-dimensional imaging data obtainable in a similar situation may include data regarding redundant/uninteresting physical feature(s) and interfere with data related to interesting physical features.

The enhanced two-dimensional imaging data is data that may be used to generate projectional images that may advantageously be used in projectional radiography, for instance. The enhanced two-dimensional imaging data is not, however limited to, for example, X-rays. Enhanced two-dimensional imaging data may be considered as projection image data and may be related to various types of three-dimensional imaging data that can be obtained via various imaging methods.

The enhanced two-dimensional imaging data may correspond/relate to or be used to provide a digitally reconstructed radiograph (DRR) image. The enhanced two-dimensional imaging data may be utilized to provide a synthetic radioscopic image.

The digitally reconstructed radiograph image data may be obtained by utilizing three-dimensional imaging data from which a portion of the original data relating to a redundant element has been essentially omitted, and using the remaining portion of the digital three-dimensional imaging data in a three-dimensional projection method to obtain two-dimensional projection image data.

Embodiments of the invention may provide new and/or enhanced possibilities for medical professionals to gain knowledge based on the enhanced two-dimensional imaging data.

Yet, it may be desirable to utilize two-dimensional images for certain purposes instead of three-dimensional models or typical images that may be obtained through three-dimensional imaging techniques. Especially in the case of, for example, orthopaedics, two-dimensional image projections are typically viewed on flat X-ray projection screens, whereby provision of enhanced projection data and images producible therethrough may be facilitated by the invention and present possibilities for improvement in orthopaedic use.

Enhanced two-dimensional images or data that may be provided through embodiments of the invention may also be advantageous for providing, for example, insurance companies and/or health care systems with images or imaging data that corresponds to traditional X-ray projection data, as these may be required.

In one embodiment, the enhanced two-dimensional digital imaging data may comprise data indicative of a selected viewing angle, optionally a selected viewing angle with respect to an area of interest. The selected viewing angle may be an optimized viewing angle. The invention may thus be used to obtain, for example, digitally reconstructed radiographic imaging data where an enhanced two-dimensional image in the selected viewing angle may be obtained, where the viewing angle is precise and redundant elements are omitted. Such images may not be obtainable using traditional methods, where, for example, X-ray images are taken from a patient. In these cases, it may not be possible to obtain an X-ray image precisely from the desired viewing angle, because positioning of the patient into an exact position may not be possible. In other prior art methods where a viewing angle of projection images could in theory be selected, possible redundant elements may still obstruct the view of elements of interest/an area of interest.

With embodiments of the invention, maximum visibility of an area of interest may be ensured. In advantageous embodiments, an optimized digitally reconstructed radiograph image may thus be obtained, where a viewing angle of the DRR image is optimized.

In one embodiment, digitally reconstructed projection image data may be generated by simulating attenuation of beams of electromagnetic radiation through the remaining elements (elements not including the redundant element(s)) based on the remaining portion of the three-dimensional digital imaging data, wherein the attenuation of the beams is determined through local intensity data of the three-dimensional digital imaging data.

In embodiments of the invention, a three-dimensional model of at least one element is generated or determined based on the three-dimensional digital imaging data and may be carried out through utilizing image segmentation.

Element refers here to entities that may be partitioned from the three-dimensional digital imaging data. The elements comprise at least one physical feature that the three-dimensional digital imaging data is indicative of. In some embodiments, the elements correspond to or are equivalent to only the physical features, but in some cases the elements may also comprise, for example, noise data. In some cases the terms "physical feature" and "element" may be used interchangeably, as they may be essentially equivalent.

In some embodiments, the image segmentation method may comprise a method selected from the group of thresholding, clustering, a histogram-based method, edge detection, region-growing, a model-based method, semi-automatic segmentation, and trainable segmentation. Of course, various other methods for image segmentation may also be feasible.

Via the invention, it is not only, for example, an image or other two-dimensional data that is used from which physical features may be omitted. With data representing the three-dimensional model being determined, the elements, for example, physical features, may be effectively distinguished from each other and one or more elements may be selected as redundant elements and may be removed from the data representing a three-dimensional model and/or subsequently provided enhanced two-dimensional imaging data essentially without effecting the data or image associated with some other physical feature(s).

The remaining portion of the three-dimensional imaging data may in some embodiments be obtained through masking of the three-dimensional imaging data based on the data representing a three-dimensional model. The masking may be carried out through correlating data constituents in the three-dimensional imaging data with data points in the data representing a three-dimensional model. Masking may be used in determining which data constituents in the three-dimensional imaging data relate to the redundant elements and these data constituents may be omitted in a remaining portion of the three-dimensional digital imaging data.

If removal of selected redundant elements were attempted without the determining of data representing a three-dimensional model of the elements which may be identified from three-dimensional imaging data, the quality of the data associated with the remaining physical features which are to be comprised in the enhanced imaging data may be of poorer quality, since the effect of the redundant elements may not be able to be taken into account or reduced to a similar extent as to that which may be attained with the present invention. With the present invention, it may be possible to more accurately determine which constituents of the three-dimensional imaging data relate or correspond to the redundant elements because these constituents (e.g., voxels) may be determined through, for example, masking with the data representing a three-dimensional model of the elements. Without the data representing a three-dimensional model of the elements, it may not be possible to accurately determine which, for example, voxels should be omitted/disregarded from the three-dimensional imaging data before utilization of the data in the selected (three-dimensional) projection method.

In embodiments of the invention, the providing of enhanced two-dimensional digital imaging data may be carried out by omitting at least a portion of the three-dimensional digital imaging data relating to the one or more redundant elements based on the data representing a three-dimensional model of the elements to determine data constituents in the three-dimensional imaging data that are related to the redundant element and essentially omitting/disregarding such data constituents, and utilizing a remaining portion of the digital three-dimensional imaging data in a three-dimensional projection method.

In some embodiments, the three-dimensional projection method may be selected from the group of maximum intensity projection, minimum intensity projection, shaded surface display, volume rendering, and virtual endoscopy. The examples presented here are thus methods that may be used to convert three-dimensional imaging data into a two-dimensional image (or two-dimensional imaging data), and also other methods known to the skilled person may be feasible.

A physical feature may herein comprise tissue, for example, selected from the group of bone, ligament, cartilage, and soft tissue. Obtained three-dimensional digital imaging data may be indicative of also other physical features. For instance, implants and/or other objects may also be identified from the three-dimensional imaging data.

The elements (that may be selected as redundant elements) may in different use cases be or correspond to the physical features that the three-dimensional imaging data is indicative of, or the elements may be elements derivable from data related to the physical features, such as noise data.

In some embodiments, an arrangement may be used to enhance image quality of two-dimensional imaging data, so that the elements partitioned from the three-dimensional imaging data may comprise physical features such as tissue and additionally one or more of the elements comprises noise data or other data that is a disturbance arising from the imaging/characterization system that may also be partitioned from the three-dimensional imaging data. One or more elements comprising the noise data may then be selected as redundant elements. The noise data may then be omitted from subsequently produced enhanced two-dimensional imaging data. The enhanced two-dimensional imaging data may then be of higher quality compared to prior art imaging data where the noise data is present.

In one embodiment, the selecting of one or more elements as redundant elements may be based on predetermined criteria. The predetermined criteria may be indicative of one or more elements that are not of interest, and the predetermined criteria may be obtained via a user interface comprised in an arrangement.

In one use case scenario, a medical professional may be provided with enhanced two-dimensional imaging data where, for example, a selected redundant bone is essentially omitted from an enhanced two-dimensional image so that a relevant bone may be more clearly visible, where the relevant bone may have been obstructed by data relating to the redundant bone in images obtainable via prior art methods/arrangements.

With embodiments of the present invention, enhanced two-dimensional imaging data may be provided, which may be more useful than that which may be obtained with other available methods. Information relating to physical features of interest may be deduced from the enhanced two-dimensional data more efficiently. For instance, diagnosing may be made quicker, and the invention may even provide possibilities for diagnosis or treatment in cases where such would not be possible with available methods.

In some embodiments, an arrangement may be configured to produce an output. An output may comprise a visualization of the determined data representing a three-dimensional model of the at least one element and/or a visualization of the enhanced two-dimensional digital imaging data. An output may in some embodiments additionally or alternatively comprise a computer-readable output comprising the enhanced two-dimensional digital imaging data, which may thereafter be used at, for example, some other device for generation of an enhanced two-dimensional image. In some embodiments, an arrangement may comprise or be in communication with a printing device, so that an output may be utilized to obtain a printed enhanced two-dimensional image.

Benefits that may be attained through embodiments of the invention may also include decrease of radiation exposure to, for example, patients that are to be imaged for obtaining imaging data. For being able to interpret two-dimensional projection images, for example, for diagnosing purposes, the images should be of some adequate quality and show the relevant features. In many cases it is determined that additional imaging data should be acquired due to, for example, an X-ray image being taken from a wrong angle for the certain purpose. Via the invention, the enhanced two-dimensional imaging data and enhanced two-dimensional image obtainable therefrom may be generated so that the data can essentially always be shown from the right imaging angle and any selected projection may be obtained. Therefore, a minimum number of actual imaging situations may be used and radiation exposure to a patient may be reduced, because additional imaging data may not have to be obtained via multiple subsequent imaging situations.

The exemplary embodiments presented in this text are not to be interpreted to pose limitations to the applicability of the appended claims. The verb "to comprise" is used in this text as an open limitation that does not exclude the existence of unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific example embodiments when read in connection with the accompanying drawings.

The presented considerations concerning the various embodiments of the arrangement may be flexibly applied to the embodiments of the method mutatis mutandis, and vice versa, as being appreciated by a skilled person.

BRIEF DESCRIPTION OF THE DRAWINGS

The accompanying drawings, which are incorporated in and constitute a part of the specification, illustrate embodiments of the disclosure and together with the detailed description herein, serve to explain the principles of the disclosure. It is emphasized that, in accordance with the standard practice in the industry, various features are not drawn to scale. In fact, the dimensions of the various features may be arbitrarily increased or reduced for clarity of discussion. The drawings are only for purposes of illustrating preferred embodiments and are not to be construed as limiting the disclosure.

DETAILED DESCRIPTION FOR CARRYING OUT THE INVENTION

Figure 1:
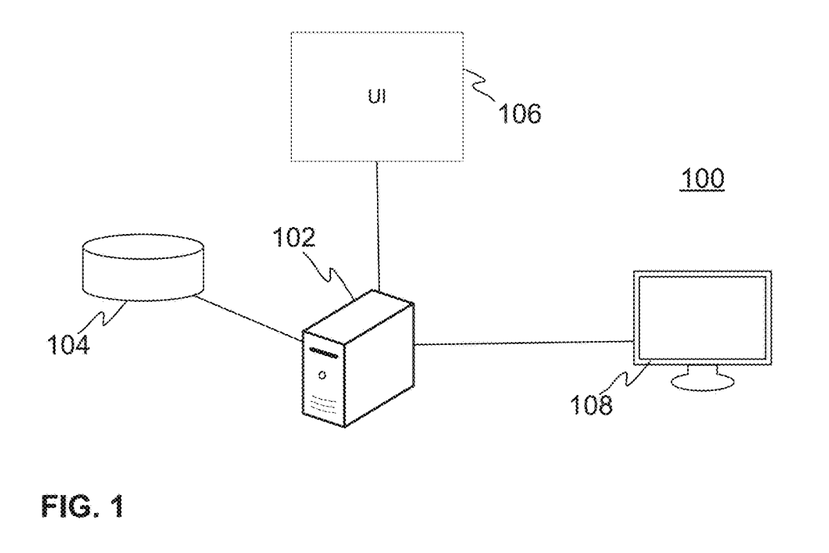
FIG. 1 shows an exemplary schematic arrangement according to one embodiment of the invention, in accordance with an aspect of the present disclosure.

FIG. 1 shows one embodiment of an arrangement 100 according to the present invention. The arrangement 100 comprises at least one processor 102 that is configured to obtain three-dimensional digital imaging data.

The processor 102 may be configured to execute instructions embodied in a form of computer software stored in a memory, which may refer to one or more memory chips, for example, separate or integrated with the processor 102. The memory may also store further data in addition to the program instructions. The software may define one or more applications for executing the activities described herein and may implement one or more computational algorithms for performing the operations involved in the method.

The processor 102 may comprise or be in communication with one or more databases 104 which may be used for information storage or retrieval. A database 104 may be stored in a memory associated with the processor 102.

The processor 102 may be a local processor comprised in a personal computer-type computing arrangement or the processor 102 may refer to one or more remote processors that may be accessible via, for example. wireless methods.

A user interface (UI) 106 may provide control and information access tools for a user of the arrangement 100, for example controlling the arrangement, providing input data for example to the processor 102.

The three-dimensional digital imaging data may be provided to the processor 102 as input data for instance in the form of DICOM data. For example, DICOM data may be provided directly to the processor 102 via an imaging device via wired or wireless connection (such as WLAN) or the DICOM data may be provided to the processor 102 in some other way, for example imported via a carrier medium or transferred as a signal or combination of signals wiredly or wirelessly from a transmitting element to a receiving element.

The three-dimensional imaging data may be three-dimensional imaging data obtained by a scanning method such as computed tomography, magnetic resonance imaging, or ultrasonic scanning.

The three-dimensional digital imaging data is indicative of at least one physical feature of a target entity, such as a human patient, that has been subjected to the selected imaging method. The physical feature may be tissue such as bone, ligament, cartilage, or soft tissue. The three-dimensional digital imaging data may in various embodiments be indicative of a plurality of physical features, for example, one or more tissues or tissue portions.

The processor 102 is configured to determine, based on the three-dimensional imaging data, data representing a three-dimensional model of at least one element that may be partitioned from the three-dimensional imaging data, the at least one element comprising at least one physical feature that the three-dimensional imaging data is indicative of. In the use case scenarios presented below, the elements essentially correspond fully to the physical features that the three-dimensional imaging data is indicative of. The elements may therefore herein be also called physical features. The data representing the three-dimensional model of the at least one element may comprise points in three-dimensional space to represent the at least one element, such as bone or other physical features that may be identified from the three-dimensional imaging data.

In some cases, the three-dimensional imaging data obtained may not be utilized in full, in another words, the three-dimensional imaging data may be indicative of a plurality of physical features, of which some portion will not be comprised in the data representing a model of the element(s). This may be the case for instance if the three-dimensional imaging data spans an entity, for example, a patient, over a larger area than that which is of interest in the case.

In some embodiments, the data representing the three-dimensional model may be presented as a visual image or a visualization to a user of the arrangement 100. An arrangement 100 may comprise or be in communication with one or more display elements 108 for creating and displaying visualizations.

The data representing a three-dimensional model of the at least one element may be obtained from the three-dimensional digital imaging data through utilizing any type of method available for converting three-dimensional imaging data into data representing a three-dimensional model of elements such as physical features identifiable from the three-dimensional imaging data, as will be known to the skilled person. Image segmentation methods may be used to partition a digital image into multiple segments or image objects. Pixels or voxels of an image may be categorized or characterized to group the pixels or voxels or determine which ones have similar characteristics. The result obtained from the three-dimensional imaging data via the image segmentation method is thus data representing a three-dimensional model of at least one element, where the elements are partitioned from the imaging data and the data representing a three-dimensional model therefore gives information on three-dimensional aspects of the partitioned elements.

In some embodiments, one or more additional modeling methods may be utilized for obtaining a 3D reconstructed model or three-dimensional representation from the data representing a three-dimensional model of the at least one element. For instance, image-based meshing may in some use case scenarios be used to further process the data representing a three-dimensional model of the at least one element. This further processed data may for instance be used in creating a visualization of the data representing a three-dimensional model of the at least one element or other visualizations.

Through the utilized modeling method(s) such as image segmentation, the one or more elements, for example, physical features, may be identified/distinguished from the three-dimensional digital imaging data so that the elements may be individualized and presented as entities in the data representing a three-dimensional model of the one or more elements.

For example, visualizations presented herein may be obtained via using an additional modeling method, such as image-based meshing, but such methods do not need to be used to carry out the invention. Visualizations of three-dimensional models or 3D reconstructed models are thus not necessarily required in embodiments of the invention but are presented here to ease in understanding.

One or more of the elements may then be selected as redundant elements. The selected redundant elements may be elements or features that are not of interest, in another words, uninteresting/insignificant/irrelevant, in a particular use case scenario. The selected redundant elements may for instance be bone or other tissue that may in some cases interfere with a view of a more interesting element or physical feature. Thus, the selected redundant elements may also be physical features that are, in a particular use case scenario detrimental or disturbing in certain cases, where it is other physical features that are to be inspected in a two-dimensional image.

The selecting of redundant elements may be based on predetermined criteria. Such predetermined criteria may be provided by a user of the arrangement 100 or the predetermined criteria may be provided or deduced by the arrangement 100 in an automated fashion based on, for example, other information provided, for example, by a user.

In some embodiments, a user of the arrangement 100 may through visual inspection of a visualization of the three-dimensional model provided via a display element 108 select the redundant elements. This may for instance be done via the UI 106 by the user clicking on visualized elements, for example, physical features, in the three-dimensional model. It may also be possible that the user selects, instead of explicitly selecting the redundant elements, elements that are of interest, while one or more of the remaining elements are then deemed as redundant elements.

In some embodiments, a user may select redundant elements by, for example, naming such elements or selecting from a list provided by the arrangement 100 (or alternatively naming elements/physical features of interest and the processor 102 then deeming remaining elements identified in the three-dimensional model as redundant elements) via a UI 106.

Automatic recognition of elements based on predetermined criteria may be utilized and automatic selection of a recognized element as redundant may be carried out for instance through information available in a database. For example, an arrangement 100 may be able to recognize, from characteristics that are derivable from the three-dimensional imaging data (such as intensity data) and/or data representing a three-dimensional model of the element, for example, element type, such as identify an element as a specific bone or tissue type, such as being able to recognize tissue as bone tissue or fat tissue etc.

A user may in alternative embodiments select (or facilitate selection of) redundant elements by providing information regarding a use case scenario to the arrangement 100. For instance, a user could provide information indicative of a medical condition that is to be inspected. Information available to the arrangement 100, for example, via a database 104 may then be utilized to select redundant elements/features based on available information that relates the information provided by the user to one or more specific, for example, tissues that may be regarded as redundant (or, of course, alternatively important physical features could also be identified, in which case remaining elements identified could for example be deemed redundant). As an example, a user of the arrangement 100 could indicate that a bone fracture of certain type is to be inspected via the provided enhanced two-dimensional imaging data. The arrangement 100 may then based on this information be able to select the redundant elements and provide only, for example, information regarding a specific bone in the enhanced two-dimensional imaging data.

In one embodiment, the selected redundant elements may be portions of physical features. For instance, in some cases, for example, a bone may be identified from the three-dimensional imaging data as an element, while the selected redundant element may be a portion of said bone.

The arrangement 100 may then provide enhanced two-dimensional imaging data indicative of the at least one physical feature with the one or more redundant elements being omitted from the two-dimensional imaging data based on at least the data representing a three-dimensional model of the at least one physical feature and the selection of at least one redundant element through processing of a remaining portion of the three-dimensional imaging data, from which data constituents relating to the redundant element have been omitted.

Data constituents in the three-dimensional imaging data that are related to the redundant element may be determined through masking of the three-dimensional imaging data based on the data representing a three-dimensional model. Through this, the remaining portion of the three-dimensional imaging data may be determined, which remaining portion is to be utilized in generation of the enhanced two-dimensional imaging data.

The enhanced two-dimensional imaging data may then be utilized to create a two-dimensional image where one or more physical features are visualized, where the selected redundant elements, for example, physical features, are omitted. The omitted redundant elements are thus essentially removed or subtracted from the image (data).

The one or more redundant elements being omitted from the enhanced two-dimensional imaging data may mean that data related to the redundant elements may be essentially omitted from the two-dimensional imaging data at least to such extent that the redundant element(s) are not clearly visible in a two-dimensional image that may be generated using the enhanced two-dimensional imaging data. The enhanced two-dimensional imaging data may thus in some embodiments or use case scenarios comprise remainders of data relating to the redundant element(s) but this remaining data may be minimal or at least be below some threshold value.

The enhanced two-dimensional imaging data may be provided based on at least the data representing a three-dimensional model of the at least one element, the selection of at least one redundant element, and the three-dimensional imaging data, so that at least a portion of the three-dimensional imaging data relating to the one or more redundant physical features is omitted from the three-dimensional imaging data and a remaining portion of the digital three-dimensional imaging data is used in connection with a three-dimensional projection method.

The omitting of at least a portion of the three-dimensional imaging data relating to the one or more redundant elements may be carried out through comparison or masking of the three-dimensional imaging data to the data representing a three-dimensional model of the at least one element and recognizing/identifying data constituents of the three-dimensional imaging data that correspond to the redundant element and omitting/disregarding such data constituents to obtain a remaining portion of the three-dimensional digital imaging data.

A three-dimensional projection method may be any projection method that may be used to convert three-dimensional imaging data into two-dimensional imaging data. A method that may be used to obtain points in a two-dimensional plane based on points in three-dimensional space may therefore be used. A three-dimensional projection method may therefore be a method that is used to map or project three-dimensional data into two-dimensional data.

Relating to medical imaging data, three-dimensional imaging data such as DICOM data may provide information on intensity of energy beams as they traverse through physical features such as tissue and intensity of the beams is attenuated as a physical feature is confronted.

Different three-dimensional projection methods used may thus use different ways of mapping or projecting intensity data, where intensity data is equivalent to or is comprised in the three-dimensional imaging data.

Typically, a two-dimensional projection image may be obtained from three-dimensional imaging data so that all voxels comprised in, for example, DICOM data or derivable therefrom are utilized. The resulting two-dimensional image may then have physical features of interest that are not visualized in sufficient quality due to interfering data relating to redundant physical features.

Data relating to intensity of energy beams as they have traversed through, for example, tissue may be used as the three-dimensional imaging data so that the data is summed at least one viewing angle in two-dimensional imaging data.

In advantageous embodiments of the invention, the enhanced two-dimensional imaging data may be digitally enhanced projection image data such that voxels comprised in or derivable from the three-dimensional imaging data that are indicative of redundant physical features may be omitted or disregarded when converting the three-dimensional imaging data into two-dimensional imaging data.

For instance, a portion of the three-dimensional imaging data relating to redundant elements such as physical features may be omitted in a sum that may be used to obtain enhanced two-dimensional imaging data.

The three-dimensional digital imaging data may in one embodiment be modified, based on, for example, masking, to comprise only the remaining portion (with data relating to redundant elements omitted) and then the modified three-dimensional imaging data may be utilized, for example, in a projection method to obtain the enhanced two-dimensional digital imaging data.

In one other embodiment, the three-dimensional imaging data itself may not be modified, but via, for example, masking, only the remaining portion is utilized to obtain the enhanced two-dimensional digital imaging data.

Relating to the provision of radiographic images, in a native X-ray scan, a flow of photons arrives from an emittor and penetrates the patient, where some photons are absorbed within the tissue (the rate of absorption correlates with the passed tissue type, with at least somewhat known rate), while the rest of the flow of photons arrives onto a detector on an opposite side of the patient. The two-dimensional distribution of these passed photons yields the clinical 2D X-ray image (conventional). The absorbing of photons corresponds to attenuation of the X-rays/electromagnetic radiation as they pass through the tissues.

Then, in connection with three-dimensional digital imaging data, for example in CT imaging, three-dimensional imaging data where each 3D-pixel (voxel) carries an intensity value may be obtained, which similarly correlates with the tissue type at hand. In digital radiograph reconstruction, one may compute/determine a number of "simulated" photons/photon flows corresponding to X-rays passing the three-dimensional digital imaging data at specific locations (e.g., in raycasting methods). At each linear increment along this simulated ray of electromagnetic radiation, the three-dimensional digital imaging data may be considered to attenuate the ray with a rate corresponding to the local (pixel/voxel) intensity of the three-dimensional digital imaging data (tissue radio-opacity i.e. absorption rate). Thus, when the entire ray is computed, the end result may resemble how an actual, physical photon flux of an, for example, X-ray would have attenuated along a line corresponding to the computed (raycasted) line. The three-dimensional digital imaging data therefore may be indicative, via the local intensity data, of an element type (e.g., bone or other tissue) such that in a used (three-dimensional) projection method, attenuation of a simulated (X-)ray may be simulated/calculated such that the end result (DRR) may essentially correspond to a traditional X-ray image obtained from the, for example, tissue/elements.

The local intensity data or relative density data at each point in the three-dimensional digital imaging data may be calibrated into a Hounsfield value. On the Hounsfield scale, a value of −1000 corresponds to air, while a value of 0 corresponds to water. From the three-dimensional digital imaging data, using the intensity values and Hounsfield scale, a type of tissue may be determined (e.g., dense bone +300 or over and fat from −100 to −50). The correlations between tissue type and Hounsfield value may be known or may be input to an arrangement 100 or may be available to the arrangement 100, for example, via a database.

Upon having knowledge (in 3D terms) where a redundant element is (exactly) located in the three-dimensional digital imaging data, this may be taken into account at the, for example, raycasting step when adding each linear positions' contributions to the end result (DRR or enhanced two-dimensional digital imaging data) by omitting or disregarding corresponding voxels in computation of ray attenuation. Alternatively, data constituents relating to the redundant element may be essentially removed from the three-dimensional digital imaging data, and thereafter carrying out the projection (e.g., computation of attenuation of simulated, for example, X-rays passing through the remaining three-dimensional digital imaging data). The end result would essentially be the same, depending on details of implementation.

Other projection methods may be chosen if linear attenuation is not the most clinically useful projective representation (e.g., maximum intensity projection would collect, along each raycast, the maximum value such that anything below the maximum value of pixel intensity would not contribute to the end result in any way).

In the computation of the DRR data, a selected viewing angle may also be taken into account, such that the simulated rays are directed accordingly.

In particular, it is one aspect of advantageous embodiments of the invention that the generated data representing a three-dimensional model of the elements may be used to effectively determine which data constituents, for example, voxels comprised in or derivable from the three-dimensional imaging data related to which physical features or elements. Then, data related to selected redundant elements or physical features may be essentially omitted without omitting data related to the remaining physical features of interest.

A visualization of the enhanced two-dimensional imaging data and/or other data (such as three-dimensional models) may be provided to a user of the arrangement through a display element 108.

Figure 2:
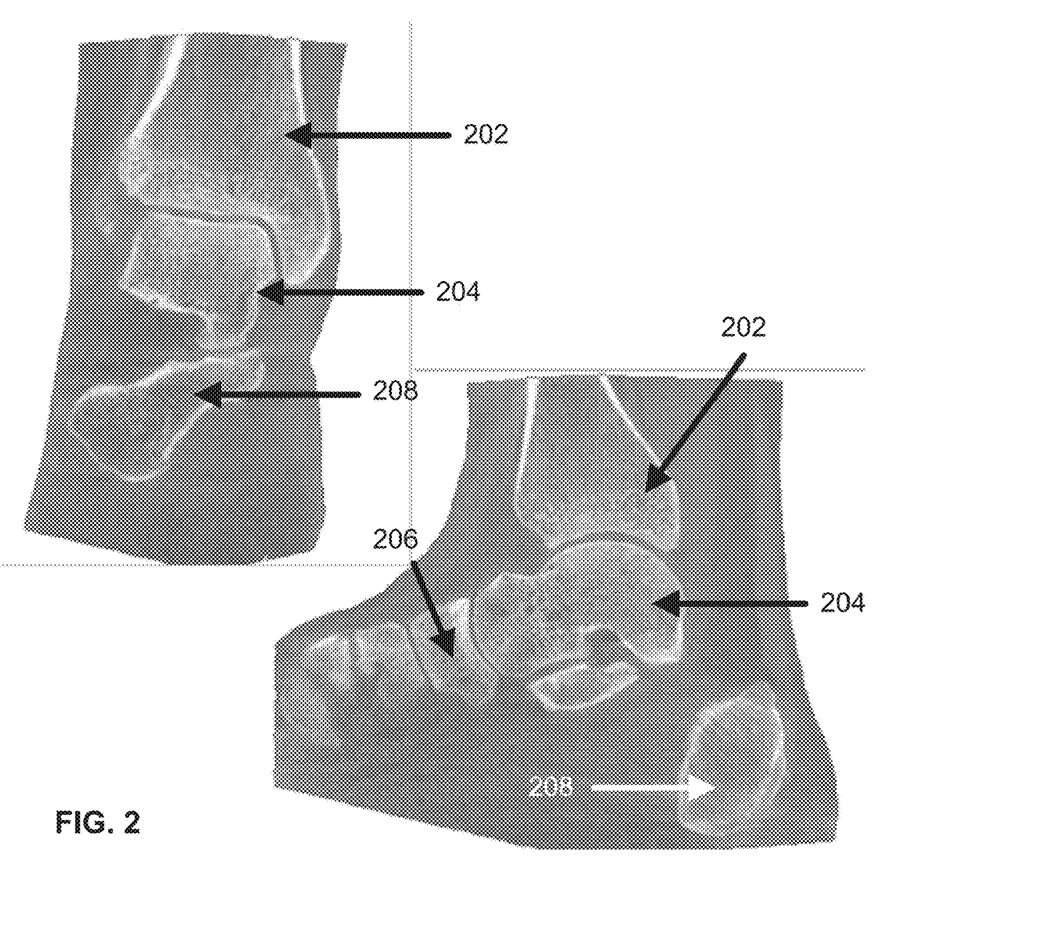
FIG. 2 shows exemplary visualizations of slices of three-dimensional imaging data that may be utilized in one use case scenario of an embodiment of the invention, in accordance with an aspect of the present disclosure.
Figure 3:
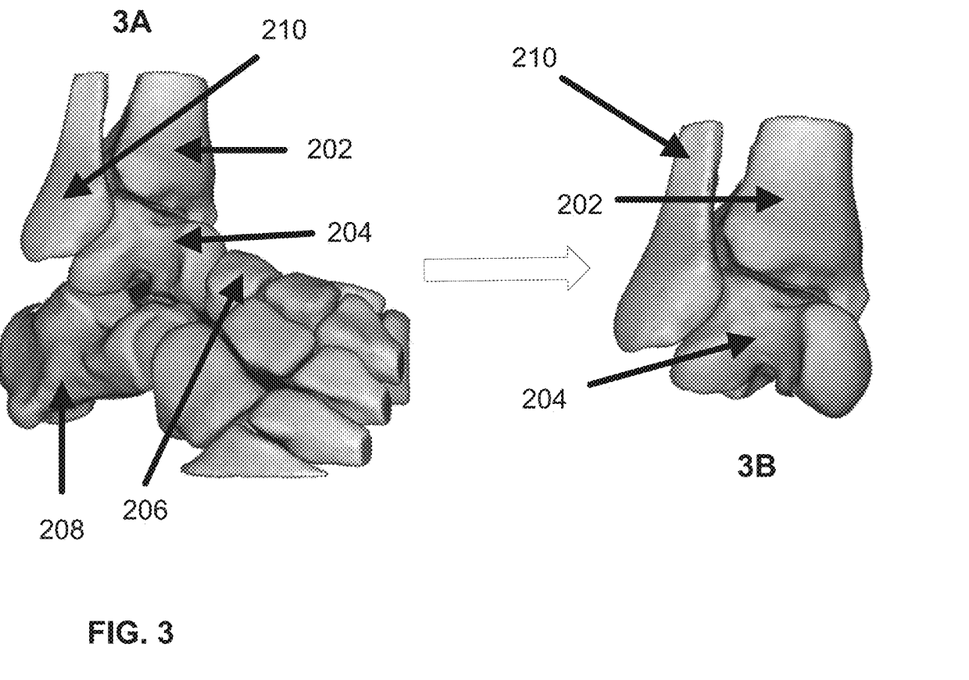
FIG. 3 depicts images 3A and 3B exemplary visualizations of data representing a three-dimensional model that may be utilized in one use case scenario of an embodiment of the invention, with image 3B showing a visualization of a three-dimensional model with redundant physical features omitted, in accordance with an aspect of the present disclosure.
Figure 4:
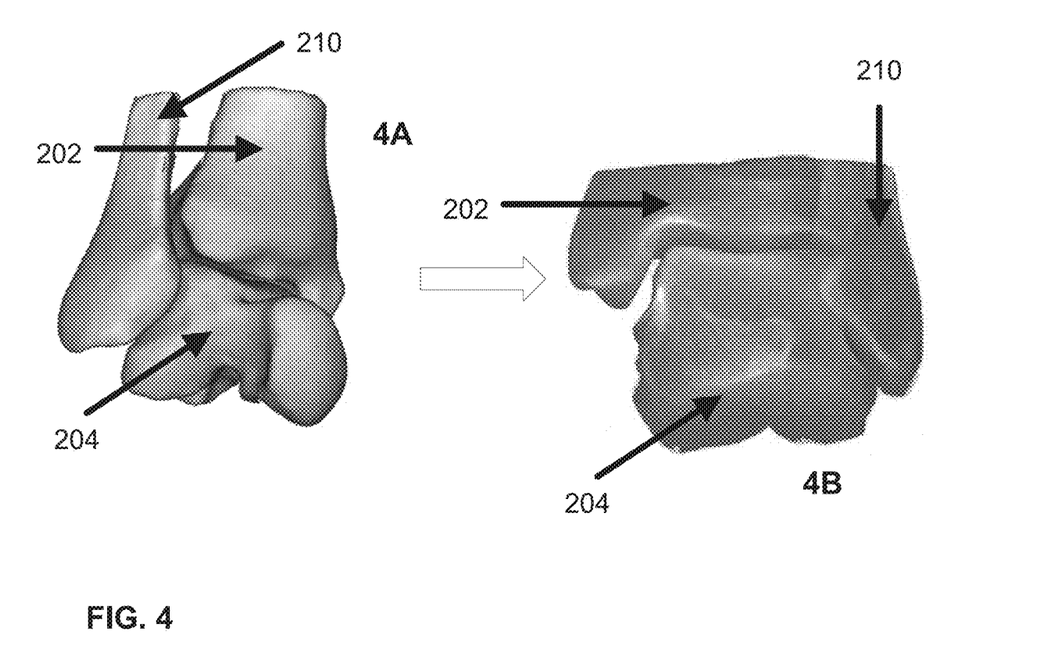
FIG. 4 shows in image 4A, a visualization of a three-dimensional model with redundant physical features omitted and based thereon and in image 4B, a visualization of enhanced two-dimensional imaging data that may be provided in one exemplary use case scenario of an embodiment of the invention, in accordance with an aspect of the present disclosure.

FIGS. 2-4 relate to one use case scenario of an exemplary embodiment of the invention. FIG. 2 shows exemplary visualizations of three-dimensional imaging data that may be received or utilized by an arrangement 100 in one embodiment of the invention. The shown slices of imaging data of FIG. 2 are indicative of a plurality of physical features. In FIG. 2, the physical features may be several bones 202, 204, 206, 208 of a foot of a patient that has been subjected to the imaging. Only a portion of the physical features in the figures have been numbered here. Of course, also various additional image slices may be provided and more physical features could be identified and/or the physical features may be qualified at various depths and/or viewing angles.

It may be easily seen from FIG. 2 that the visualizations, in another words, two-dimensional images that may be obtained from the three-dimensional imaging data may not, as such and especially separately, be very informative regarding the physical features or any three-dimensional aspects thereof.

FIG. 3 depicts at image 3A an exemplary visualization of data representing a three-dimensional model of physical features 202, 204, 206, 208 and 210 that may be identified utilizing at least the data of FIG. 2. Note that in this particular use case scenario, of course slices visualized in FIG. 2 are only show as examples and would not be sufficient for obtaining data relating to the three-dimensional model visualized in FIG. 3 (bone 210 is not visible in FIG. 2 and data relating to this physical feature has thus been obtained using supplementary imaging data which cannot feasibly be show in full herein). The data representing a three-dimensional model may be obtained through utilizing image segmentation.

In some embodiments, the data representing a three-dimensional model may be visualized and provided to a user of the arrangement. In one embodiment, the user may be able to rotate the three-dimensional model thus depicted (e.g., one corresponding to that of image 3A) and may inspect the physical features.

One or more of the physical features that are identifiable from the three-dimensional model may be selected as redundant physical features. Selection of redundant physical features may herein also refer to implicit selection of redundant physical features through selection of important physical features that are not to be comprised in the group of redundant physical features.

In one embodiment, a three-dimensional model may be visualized for inspection by a user of the arrangement 100 and the user may then via the UI 106 indicate, for example, by clicking on one or more visualized physical features, those which shall be selected as redundant physical features.

In the case of image 3A, physical features other than bones 202, 204, and 210 may be selected as redundant. Thus, for example, bones 206 and 208, along with any other or preferably all other depicted physical features may be selected as redundant physical features. This selection may be done, for example, by a user of the arrangement indicating selection of bones 206, 208, etc. as redundant or by a user of the arrangement indicating that bones 202, 204, and 210 are of interest and thus implicitly selecting bones 206, 208, etc. as redundant.

Data representing a three-dimensional model of the at least one physical feature may then be provided, where the redundant physical features are omitted. Image 3B depicts a visualization of such data, where only bones 202 and 203 are included. A three-dimensional model may thus be provided where physical features identified via the imaging data may be included, with redundant physical features being omitted. Such a model or visualization (i.e., corresponding to that of image 3B) does not necessarily have to be created or depicted, as the enhanced two-dimensional imaging data may be obtained through the original three-dimensional model (corresponding to image 3A) and information concerning the selected redundant physical features.

In some embodiments, a visualization of the three-dimensional model may be provided to a user of the arrangement and the user may indicate a viewing angle based on which the enhanced two-dimensional imaging data is to be provided/generated. For instance, a user may be able to rotate the three-dimensional model (possibly one that has selected redundant features being omitted) on a display 108 screen and arrive at a desirable viewing angle and indicate that the enhanced two-dimensional imaging data shall correspond to an image viewed from that angle.

A selected viewing angle for the enhanced two-dimensional digital imaging data (or enhanced two-dimensional digital image) may selected by a user of the arrangement or a selected viewing angle may be determined by the arrangement, for example, based on the use case scenario, such as information characterizing an area of interest (e.g., data regarding a specific joint). The selected viewing angle may be an optimized viewing angle, optimized with respect to an area of interest.

Visualizations of an exemplary use case scenario are depicted in images 4A and 4B, with image 4A showing a visualization of data representing a three-dimensional model of the at least one physical feature where the redundant physical features are omitted (showing only bones 202, 204, and 210 with other bones omitted) and 4B showing a visualization of enhanced two-dimensional imaging data (enhanced projection image), where essentially only bones 202, 204, and 210 are included.

Relating to the use case scenario above, ankle AP mortise view is part of a three view series of the distal tibia, distal fibula, talus and proximal metatarsals. It is the most pertinent projection for assessing the articulation of the tibial plafond and two malleoli with the talar dome, otherwise known as the mortise joint of the ankle.

As shown in FIG. 4, the enhanced two-dimensional image 4B shows the mortise joint of the ankle from a selected/optimized viewing angle. The selected viewing angle allows an optimum viewing point for the joint, while the view is also unobstructed due to the redundant elements being omitted in the enhanced two-dimensional image.

Figure 5:
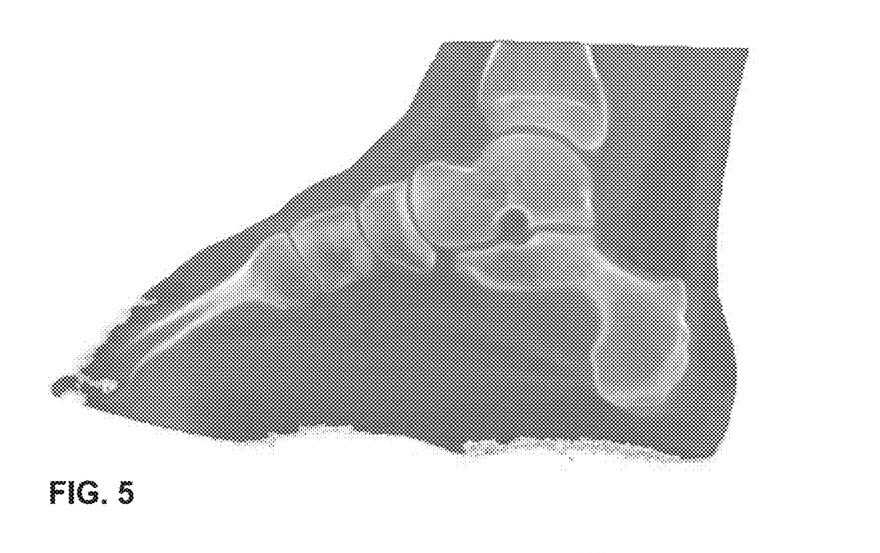
FIG. 5 shows an exemplary visualization of a slice of three-dimensional imaging data that may be utilized in one other use case scenario of an embodiment of the invention, in accordance with an aspect of the present disclosure.
Figure 6:
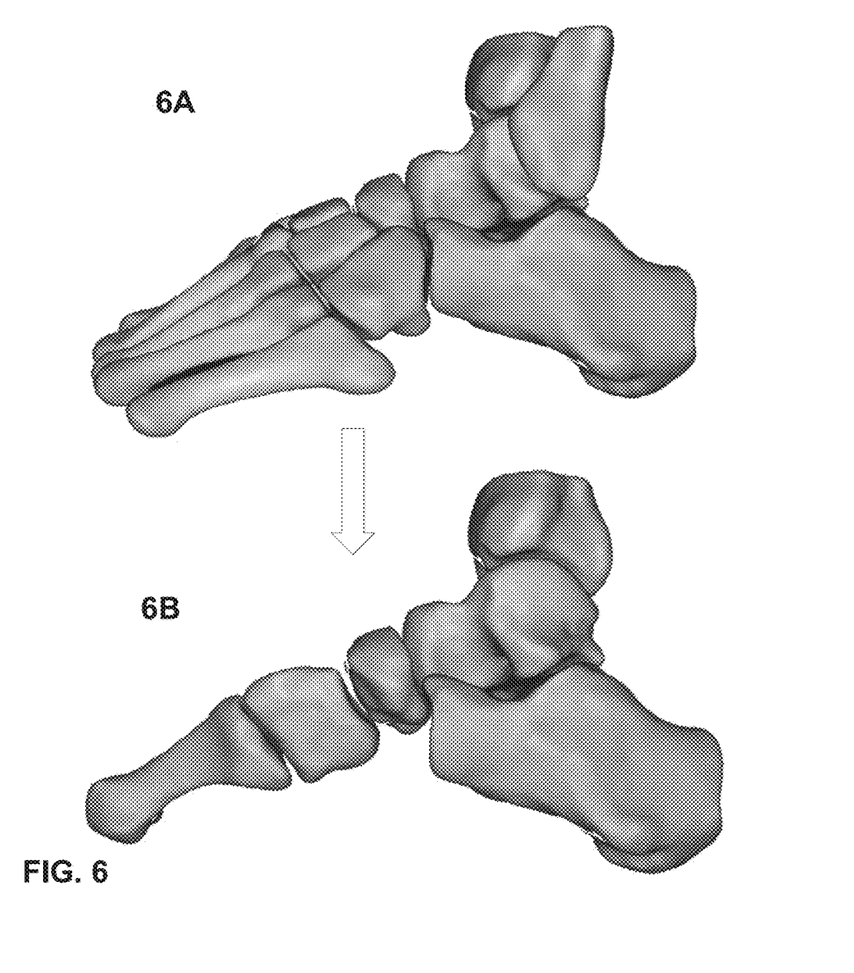
FIG. 6 illustrates in images 6A and 6B, exemplary visualizations of data representing a three-dimensional model that may be utilized in one other use case scenario of an embodiment of the invention, with image 6B showing a visualization of a three-dimensional model with redundant physical features omitted, in accordance with an aspect of the present disclosure.
Figure 7:
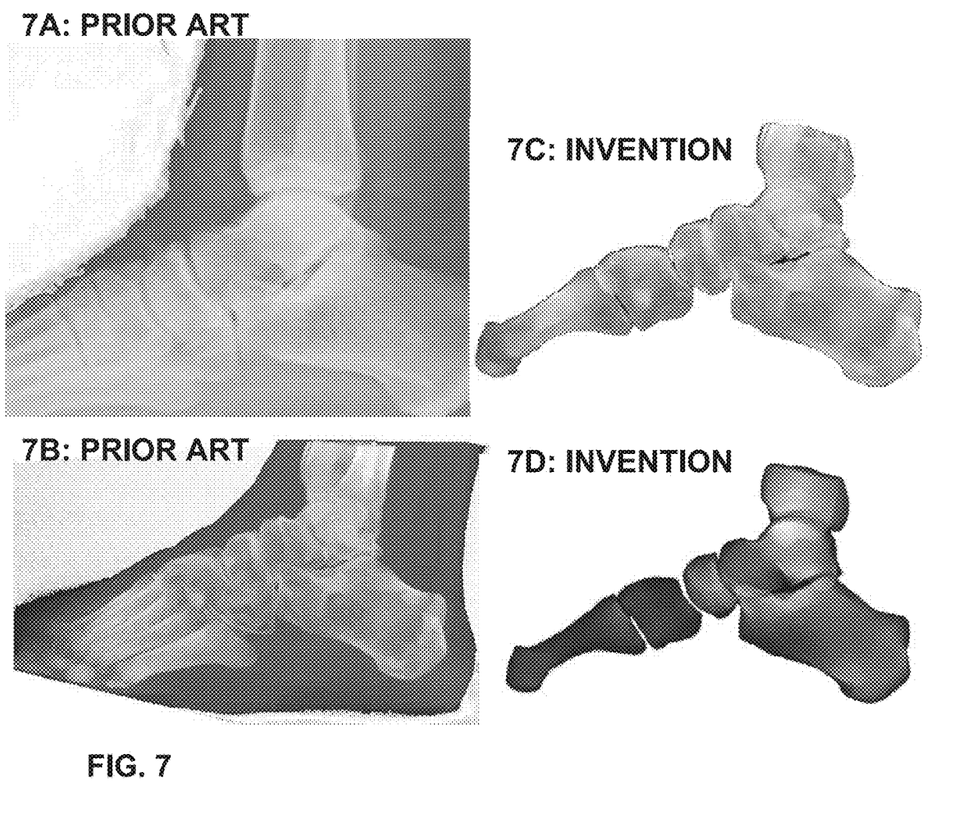
FIG. 7 shows in images 7A and 7B visualizations of traditional two-dimensional imaging data, and in images 7C and 7D, visualizations of enhanced two-dimensional imaging data that may be obtained use case scenarios via an embodiment of the arrangement, in accordance with an aspect of the present disclosure.

FIGS. 5-7 relate to one other possible/exemplary use case scenario of one embodiment of the invention. FIG. 5 shows an example of a slice of three-dimensional imaging data that may be obtained by an arrangement 100 which is indicative of a plurality of bones. FIG. 6 shows in image 6A one exemplary visualization of data representing a three-dimensional model of the physical features, in another words, bones that may be identified from the data visualized in FIG. 5 (and other slice data relating to three-dimensional imaging data of the same target).

Image 6A shows an exemplary visualization of data representing a three-dimensional model of the physical features that may be identified from at least the data visualized in FIG. 5, with image 6B showing a visualization of the data representing a three-dimensional model of the physical features with selected redundant physical features omitted. As has been set forth hereinbefore, the selection of redundant physical features may be done explicitly or implicitly and it may be done by a user of the arrangement or it may be done autonomously or at least semi-autonomously by an arrangement 100 based on available information, received for instance from a user of the arrangement 100.

The provision of visualizations such as the exemplary visualizations presented herein in connection with the exemplary use case scenarios is not necessary for operation of the arrangement 100, but in some cases may be advantageous for providing a user of the arrangement with information related to the identified physical features and may enable the user to more effectively determine which of the physical features shall be selected as redundant physical features.

FIG. 7 shows in images 7A and 7B, a visualizations of traditional two-dimensional imaging data that may be obtained with prior art methods. Image 7A depicts a traditional native X-ray image that may be obtained from a target in the same or similar case corresponding to the previous FIGS. 5-6. Image 7B shows a two-dimensional projection image that may be obtained from three-dimensional imaging data where data representing a three-dimensional model of physical features has not been used and redundant physical features are not omitted.

From images 7A and 7B, it may be difficult to distinguish between the different physical features, to even see/distinguish from the image a specific physical feature, and/or to determine some relevant data relating to a specific physical feature if other physical features interfere or disturb the interpretation.

Images 7C and 7D depict an exemplary visualizations of enhanced two-dimensional imaging data (enhanced projection images) that may be obtained through an embodiment of an arrangement. Images 7C and 7D correspond to the use case scenario depicted in FIGS. 5-6, and may be obtained from the three-dimensional imaging data and via using the determined data representing a three-dimensional model and selected redundant physical features (with visualizations of the data representing three-dimensional models in images 6A and 6B, with image 6B having redundant physical features omitted). Images 7C and 7D present enhanced projection images that may be obtained with different methods for obtaining two-dimensional imaging data from three-dimensional imaging data where intensity data is mapped or projected in differing ways.

Redundant physical features are essentially omitted in images 7C and 7D, and it may be seen that the remaining physical features that are visualized in images 7C and 7D are more clearly visible than in images 7A and 7B. Using enhanced two-dimensional imaging data, such as that corresponding to the visualization of images 7C and 7D, a medical professional may more efficiently reach a diagnosis or preferred treatment regime related to a medical condition in connection with the physical features that are considered in the enhanced two-dimensional imaging data (i.e., those physical features that the obtained three-dimensional imaging data is indicative of which are not among the selected redundant physical features) than in a case where the medical professional could only consider traditional two-dimensional imaging data such as that depicted in images 7A or 7B.

Figure 8:
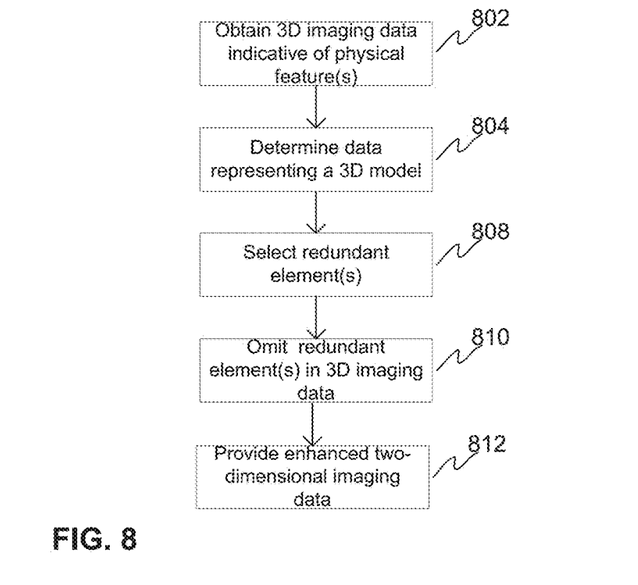
FIG. 8 is a flow chart of a method of use according to one embodiment of the invention, in accordance with an aspect of the present disclosure.

FIG. 8 shows a flow chart of a method according to one embodiment of the invention. At 802, three-dimensional imaging data indicative of at least one physical feature is obtained. At 804, data representing a three-dimensional model of at least one element that may be identified or partitioned from the three-dimensional imaging data is determined, the at least one element comprising at least one of the physical features, while at 808 one or more redundant elements are selected.

Data constituents in the three-dimensional imaging data that are related to the redundant element may be determined, while data relating to the redundant element(s) may be omitted from the three-dimensional imaging data in 810.

Finally, at 812, enhanced two-dimensional imaging data indicative of the at least one physical feature is provided, where the selected redundant elements are essentially omitted, by utilizing the remaining portion of the three-dimensional imaging data in a three-dimensional projection method.

In some embodiments, the determining of data constituents in the three-dimensional imaging data that are related to the redundant element and/or determining the remaining portion of the three-dimensional digital imaging data is carried out through masking of the three-dimensional imaging data based on the data representing a three-dimensional model.

The invention has been explained above with reference to the aforementioned embodiments, and several advantages of the invention have been demonstrated. It is clear that the invention is not only restricted to these embodiments, but comprises all possible embodiments within the spirit and scope of inventive thought and the following patent claims.

The features recited in dependent claims are mutually freely combinable unless otherwise explicitly stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The disclosure has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the disclosure be construed as including all such modifications and alterations.

What is claimed is:

1. An arrangement for provision of enhanced two-dimensional digital imaging data, the arrangement comprising at least one processor that is configured to:
   obtain three-dimensional digital imaging data indicative of physical features;
   determine, based on said three-dimensional digital imaging data, data representing a three-dimensional model of elements partitioned from the three-dimensional digital imaging data, said elements comprising at least some of said physical features, wherein the determining the data representing the three-dimensional model of elements utilizes model-based image segmentation;
   select at least one element, of the elements, as at least one redundant element;
   determine data constituents in the three-dimensional imaging data that are related to the at least one redundant element; and
   provide enhanced two-dimensional digital imaging data indicative of the physical features with the at least one redundant element being essentially omitted from the two-dimensional imaging data based at least on a remaining portion of the three-dimensional imaging data from which the data constituents related to the at least one redundant element are essentially omitted, wherein the enhanced two-dimensional digital imaging data comprises data indicative of a selected viewing angle that is determined by the arrangement based on an indicated use case scenario that characterizes an area of interest, and the selected viewing angle comprises viewing angle optimized with respect to the area of interest.

2. The arrangement of claim 1, wherein the arrangement is further configured to provide the enhanced two-dimensional digital imaging data by utilizing the remaining portion of the three-dimensional digital imaging data to obtain digitally reconstructed projection image data.

3. The arrangement of claim 2, wherein the digitally reconstructed projection image data is obtained by simulating attenuation of beams of electromagnetic radiation through remaining elements based on the remaining portion of the three-dimensional digital imaging data, wherein the attenuation of said beams is determined through local intensity data of the three-dimensional digital imaging data.

4. The arrangement of claim 1, wherein the arrangement is configured to provide the enhanced two-dimensional digital imaging data utilizing the remaining portion of the three-dimensional digital imaging data in a three-dimensional projection method, optionally selected from the group of maximum intensity projection, minimum intensity projection, shaded surface display, volume rendering, and virtual endoscopy.

5. The arrangement of claim 1, wherein the arrangement is configured to provide the remaining portion of the three-dimensional digital imaging data through masking of the three-dimensional imaging data based on the data representing the three-dimensional model.

6. The arrangement of claim 1, wherein the physical features comprise tissue selected from the group of bone, ligament, cartilage, and soft tissue.

7. The arrangement of claim 1, wherein the elements comprise tissue or noise data.

8. The arrangement of claim 1, wherein the arrangement is configured to select the at least one element as the at least one redundant element based on predetermined criteria, said predetermined criteria being indicative of one or more elements that are not of interest, the predetermined criteria optionally being obtained via a user interface.

9. The arrangement of claim 1, wherein the three-dimensional digital imaging data is obtained through a scanning method selected from the group of computed tomography, magnetic resonance imaging, and ultrasonic scanning.

10. The arrangement of claim 1, wherein the arrangement is additionally configured to provide an output to a user of the arrangement, wherein said output comprises a visualization of the determined data representing the three-dimensional model of the elements and/or a visualization of the enhanced two-dimensional digital imaging data.

11. A computer-implemented method for provision of enhanced two-dimensional digital imaging data, the method comprising:
obtaining three-dimensional digital imaging data indicative of physical features;
determining, based on said three-dimensional imaging data, data representing a three-dimensional model of elements partitioned from the three-dimensional digital imaging data, said elements comprising at least some of said physical features, wherein the determining the data representing the three-dimensional model of elements utilizes model-based image segmentation;
selecting at least one element, of the elements, as at least one redundant element;
determining data constituents in the three-dimensional imaging data that are related to the at least one redundant element; and
providing enhanced two-dimensional digital imaging data indicative of the physical features with the at least one redundant element being essentially omitted from the two-dimensional imaging data based at least on a remaining portion of the three-dimensional imaging data from which the data constituents related to the at least one redundant element are essentially omitted, wherein the enhanced two-dimensional digital imaging data comprises data indicative of a selected viewing angle that is determined by the arrangement based on an indicated use case scenario that characterizes an area of interest, and the selected viewing angle comprises viewing angle optimized with respect to the area of interest.

12. A computer program product comprising instructions causing a computer, when run thereon, to execute the method items of claim 11.

* * * * *